Patented Apr. 14, 1942

2,279,617

UNITED STATES PATENT OFFICE 2,279,617

METALLURGICAL FLUX AND METHOD OF USING THE SAME

Lewis Willard Chantler, Charles Town, W. Va., assignor to The Standard Lime and Stone Company, Baltimore, Md., a corporation of Maryland No Drawing. Application July 10, 1940, Serial No. 344,827

13 Claims. (Cl. 75—55)

The present invention relates to a lime base flux for use in the manufacture of steel and other metals by the basic open hearth, electric furnace, or basic Bessemer process, and to a method of using the same for fluxing metallurgical baths. More specifically, the object of the present invention is to provide an improved flux consisting of compressed molded forms, which may be in the nature of pellets or other self-sustaining bodies, of a lime base together with a material which disintegrates with violent disruptive action or explosive force when subjected to the heat of the furnace, or of the bath.

In the manufacture of steel by the basic open hearth, electric furnace or basic Bessemer process, it is necessary to charge a basic material, called a flux, which will combine with the impurities such as silica, phosphorus, sulphur, and the like. The term "flux" is used herein according to its generally accepted meaning in the art and without limitation to any specific technical or chemical definition. Some form of lime is generally used, such as raw limestone or fluxing lime (CaO) obtained by calcining raw limestone. Both limestone and fluxing lime have certain disadvantages.

Limestone when charged into a furnace has to be first calcined to lime by the heat of the furnace. This calcination not only robs the furnace of heat, but also lengthens the time of producing steel, causing a material increase in the cost of production.

A disadvantage of fluxing lime (quick lime) is that it slakes rapidly in the atmosphere, producing a dust that is objectionable from many standpoints. For example, this dust makes the lime unhealthful to handle, causes losses of lime in shipment and storage, and causes choking of the open hearth furnace checker chambers. In order to prevent air slaking, it is necessary to store ordinary fluxing lime in an air-tight bin. Lime in hydrate form can be used. It offers the advantage of chemical stability and freedom from dusting. It requires less heat than limestone, but more heat than fluxing lime.

A serious disadvantage of both limestone and fluxing lime which lengthens the time of producing steel is their tendency to form "islands." As customarily charged into the furnace, both limestone and fluxing lime are dumped on top of the bath from boxes containing of the order of 1,600 pounds of flux. These large quantities of flux locally cool the slag and cause the lumps of the flux to freeze into aggregates called in the trade "islands." The reaction between the slag and the flux causes an envelope of lime silicates to form around the "islands" which slows down the attack of the slag upon the flux and retards the assimilation of the flux by the slag. This results in retarding the conditioning of the slag and delaying the completion of the "heat."

The faster the lime flux is taken into solution and reacted upon by the bath in the furnace, the faster the slag is conditioned and the more rapidly is the "heat" completed. Obviously, the greater the surface of contact between a given quantity of lime flux and the slag, the more rapidly is the slag capable of absorbing and assimilating the flux, and the more rapidly will the "heat" be completed. The more finely divided the lime flux is, the greater the surface of contact between slag and flux, and the more rapidly is the flux assimilated by the slag. However, for obvious reasons, a finely divided flux could be charged on top of the bath of a furnace only with great difficulty, and with considerable loss resulting from the finely divided flux being carried into the checker chambers. For that reason, both limestone and lime are charged into the furnace in lump form, and, therefore, with a considerably reduced area of reaction surface between flux and slag.

The formation of "islands" still further reduces the reaction surface between flux and slag. Neither limestone nor lump lime is, therefore, of such a physical nature as to be conducive to rapid conditioning of the slag and rapid completion of the "heat."

The present invention resides in the provision of a granular flux containing an ingredient capable of rapidly generating a gas or vapor under the heat of the furnace or of the bath so as to disrupt the granules and distribute the flux particles over the bath of molten metal. This promotes the most rapid assimilation and absorption of the flux by the supernatant slag. Essentially, this flux comprises a lime base and a disrupting or explosive ingredient. The lime base may be of any of the usual forms, such as fluxing lime, limestone, or hydrate of lime, and will be hereinafter referred to as lime bases.

While it is known to use fluxing lime in either pulverulent or granular form, it is preferred, according to this invention, to pulverize the lime base so that when the self-sustaining bodies or pellets are disintegrated on the molten bath, the flux takes a finely divided form having the advantages set forth above. When the bodies or pellets come into contact with the supernatant slag on the molten bath, they break up with explosive violence into finely divided particles, thus enormously increasing the surface of contact between the flux and the slag, and greatly accelerating the assimilation of the flux by the slag. This results not only in a more rapid conditioning of the slag, but it reduces the time required for the "heat."

Another advantage of the flux of this invention is that it is effective in the rapid elimination of "foaming" of the slag. The formation of foam on the surface of a slag insulates the slag from the heat of the furnace and causes considerable waste of heat. Foaming indicates an acid slag not yet properly conditioned by the absorption of lime flux. Due to the slower absorption of limestone and lump lime, foaming is remedied only slowly by these fluxes. The violent disintegration of the flux of this invention causes an immediate dissemination of finely divided flux particles through the foamy slag which conditions the slag by its more rapid reaction and eliminates the "foaming."

The violent or explosive disintegration of the flux bodies is brought about by mixing with the lime base a small percentage of a substance which, when heated, liberates abruptly a large quantity of gas throughout the body and causes the body to expand and break down into smaller particles. When, for example, hydrate of lime is employed as a base, the dehydration of this base in the heat of the furnace results in the liberation of a large amount of water vapor. The liberation of this vapor, however, is not adequate or violent enough to disintegrate the bodies and to scatter the flux particles through the slag.

To secure a spontaneous complete disintegration of the bodies and the desired scattering effect of the flux particles, it is necessary to add an ingredient that will liberate very rapidly still larger quantities of gases, quantities adequate to bring about an explosive or violent disintegration of the bodies.

Suitable ingredients for causing the desired disintegration include materials such as ordinary granulated sugar which, when subjected to heat in the furnace, liberates abruptly a considerable volume of gases or vapors, or both, with the concurrent disrupting action which they exercise. For example, it has been found that the addition of about 5% by weight of granulated sugar to the flux will bring about a very desirable and satisfactory reaction. Other forms of sugar or equivalent materials may obviously be used, but it is essential that the gases liberated, and also the residue present after the liberation of the gas, shall not produce any deleterious effect on the metallurgical operation. While the use of granulated sugar is suggested and has been found to be highly effective, other forms of sugar, particularly those which are cheap and form waste products, or by-products such as molasses, may be utilized if they have the characteristics enumerated above.

Another material having desirable characteristics for the disintegrating action is explosive powder. Both black powder of the type known as blasting powder, and smokeless powders, have been used successfully. Black powder contains sulphur and this is an undesirable ingredient and one which a flux is designed to remove from the molten metal. For practical reasons, therefore, it is desirable to use a powder substantially free from sulphur. A black powder completely free from sulphur is obtainable and where the expense is not prohibitive it can be used. While the proportions of the powder used may vary, a suitable amount is from about 0.1% to 3.0% by weight of the body, and in nearly all cases the amount of sulphur introduced by the powder is tolerable. Generally considered the grain size of the powder is important. It should be as large as is consistent with good distribution in the flux particles.

The invention contemplates the use of explosive materials equivalent to those named and capable of being pelleted along with the pulverized lime and appropriate binder when necessary.

The lime flux of this invention has the additional advantage that by varying its composition, other desirable constituents can be introduced equally effectively into the bath and the slag. Thus, if it be desired to increase the iron oxide content of the slag, pulverized iron oxide may be mixed with the lime base in any desired proportions.

The rapid disintegration of the bodies or pellets in the bath distributes the iron oxide effectively through the slag and facilitates its rapid absorption by the slag. Similarly, any other ingredient, such as manganese oxide or the like, that it may be desired to introduce into the slag, may be added in pulverized form in any desired amount to the flux. This cannot be accomplished when lump limestone or lump lime is used as a flux.

The specific gravity of the flux of this invention is dependent somewhat on the pressure used in making the molded forms or bodies. For example, hydrate of lime itself is a light, fluffy powder. When it is compressed into molded forms or pellets to a degree sufficient to withstand chipping and pulverization in handling, the pellets have a specific gravity of about 1.7, which is the specific gravity of the lump and pebble lime ordinarily used as a flux. The compaction of the hydrate of lime by compression into molded forms increases its weight, therefore, to that of lump and pebble lime.

Simple compaction by compression produces a molded form or pellet strong enough to withstand handling and which produces less dust and fines than do lump lime and pebble lime. Greater strength and greater resistance to the formation of dust in handling can be secured by the addition of a binder in the mix from which the pellets are made. A very effective binder is such a substance as tar. Stearic acid might also be used as a binder since it lubricates the particles of lime base and facilitates compression of the mass. The binder is completely consumed in the furnace, and it still further prevents the formation of dust in handling, and makes the pellets more resistant to the absorption of moisture, so that they require even less care in handling and storage than lump and pebble lime.

The flux of this invention is also much more resistant to deterioration on exposure to the atmosphere, as in shipment and storage, especially when it contains hydrate of lime, than pebble lime and lump lime which slake very rapidly unless carefully protected.

Pellets of the present invention may be conveniently stored and transported in waterproof bags. In this way the pellets are protected from moisture and the desired quantity for a particular use indicated without necessity of further measurement.

The following are specific examples of embodiments of this invention:

1. A high calcium limestone suitable for use as a flux was calcined. The resulting lime was hydrated in the usual manner, converting it to finely pulverized hydrate of lime. The hydrate of lime was mixed with an addition of about 5% of sugar by weight. The mix was then run through a roll pelleting machine which compressed it into hard oval-shaped pellets or bodies having a long axis of about 1 inch, cubic contents of about 0.2 to 0.3 cubic inch, and a weight of about 113 grains. The weight of such pellets was about 80 pounds per cubic foot. They were hard and resistant enough to withstand handling in shipment and use, and dense enough to withstand exposure to the air without disintegration.

Such pellets were charged into the bath of an open hearth furnace at the same time that an approximately equal weight of pebble lime was charged into the same furnace. The pellets disintegrated by violent disruption, whereas the lumps of pebble lime floated on the bath and aggregated into "islands." The lime of the pellets was dissolved and assimilated by the slag in approximately one half the time that the pebble lime was absorbed by the slag.

2. Pellets of hydrate of lime were manufactured in the same way as in Example 1, except that in addition to 5% of sugar, 5% of pulverized iron oxide was also added to the hydrate of lime, all proportions being by weight.

These pellets were charged into the bath of an open hearth furnace at the same time that an approximately equal weight of pebble lime was charged into the same furnace. The pellets disintegrated by violent disruption, whereas the lumps of pebble lime floated on the bath and aggregated into "islands." The lime and the iron oxide of the pellets were assimilated by the slag in approximately one half the time that the pebble lime was absorbed by the slag.

3. A high calcium limestone suitable for use as a flux was calcined. The resulting unslaked lime was pulverized and mixed with about 2% of black blasting powder. The mix was then run through a roll pelleting machine which compressed it into hard oval-shaped pellets or bodies of approximately the same size and weight as described in the preceding examples. These pellets were hard and resistant enough to withstand handling in shipment and use, and did not slake when shipped in waterproof paper bags.

Pellets made according to this example operated in substantially the manner set forth in the preceding examples.

While the above are specific examples, the invention is not limited to the examples given. The invention is broad enough and flexible enough to permit variations in both the composition of the product and in its manner of use.

The amount of iron oxide which is added to the lime base may vary within considerable limits depending upon the demands of the steel operator and the nature of the slag to be conditioned. The additions of slag-forming ingredients are not limited to iron oxide. Any other ingredients that it may be desired to introduce into the slag may be added to the lime base in any desired quantity either singly or together with others, and either with or without the addition of iron oxide.

The amount of sugar is not limited to about 5%, but may be in greater or in less quantity. The ingredient causing the disintegration of the pellets is not limited to sugar, but any other material may be added in any desired or required quantity that will produce the violent disintegration of the pellets in the furnace, without undesirable reactions.

The shape and size of the molded forms is not restricted to the shape and size of the pellets described. Any other suitable compacted molded forms such as briquets or tablets may be utilized. The only requirement of the invention is that a finely divided lime base be compacted into bodies of sufficient strength and density to withstand handling in shipment and use, and of size and shape suitable to be charged as a flux into the metallurgical furnace.

The production of the molded forms is not limited to a particular type of machine, such as the pelleting machine described in the examples given. The roll type of pelleting machine is cited by way of illustration only, because it has ben found entirely satisfactory for use. The invention is broad enough to include any type of apparatus that will compress a finely divided lime base, or such a lime base admixed with other ingredients that it is desired to introduce into the bath, into a product of the required hardness and density. The principal criterion which governs the size and shape of the bodies and the apparatus used is that the bodies or pellets be compacted sufficiently to hold together, with or without the use of a binder, and, at the same time, be resistant to moisture, and to handling without crumbling, dusting or other appreciable disintegration or deterioration, either chemically or physically.

When the lime base used is the hydrate of lime, it is not necessary to use a binder to produce pellets strong enough to withstand handling in shipment and use, or to add a water repellent binder to produce pellets that are resistant to moisture. If greater strength or greater resistance to moisture are desired, such binders may be added in suitable quantities to the hydrate of lime. If pulverized quick lime be used as the lime base in the manufacture of the flux, it becomes more desirable to add a water repellent binder, such as tar or other suitable substance, to protect the pellets against deterioration and disintegration that may be produced by slaking. If pulverized limestone is used as the lime base of the flux, it is preferable to add a binder.

In its broadest aspect, the product of this invention is a metallurgical flux, comprising dominantly a mechanically compacted finely divided lime base, which is disintegrated by a gas liberating ingredient to finely divided particles by the expansive force of gases generated within the flux itself when it is charged in the furnace onto the supernatant slag on the molten bath.

This application is a continuation-in-part of my prior application Serial No. 270,219, filed April 26, 1939.

I claim:

1. A metallurgical flux in the form of a self-sustaining compacted body comprising hydrate of lime and an ingredient capable, when heated, of liberating gas to disintegrate said body.

2. A metallurgical flux in the form of a compacted body comprising hydrate of lime and sugar.

3. A metallurgical flux in the form of a compacted body comprising hydrate of lime and sugar of the order of 5% by weight of the body.

4. The method of distributing treating material substantially uniformly over the supernatant slag on the bath in a furnace for producing steel by the basic process, which consists in preparing the treating material in the form of discrete bodies comprising a major portion of a treating material and a minor portion of an explosive ingredient which changes abruptly to the gaseous state under the heat in the furnace to disintegrate the bodies and distributing the bodies over the surface of said slag.

5. The method of fluxing a metallurgical bath in a furnace for producing steel by the basic process which method consists in preparing the material in the form of discrete bodies comprising a major portion of a lime base as a fluxing material and a minor portion of an explosive ingredient capable of violent disruption under the heat in the furnace to disintegrate the flux and deposit it in finely divided form over the surface of the slag, and distributing the bodies over the surface of the supernatant slag in the furnace.

6. A metallurgical flux in the form of a compacted lime base and black powder.

7. A metallurgical flux in the form of a self-sustaining compacted body comprising a lime base and an explosive powder free from sulphur.

8. A metallurgical flux in the form of a compacted body made up of pulverized quick lime and black powder of the order of 2% by weight of the body.

9. A metallurgical flux in the form of a self-sustaining compacted body comprising a major portion of a lime base and a minor portion of a combustible powder capable of exploding under furnace heat to disrupt the body and scatter the lime base in finely divided form over the surface of the metal bath in the furnace.

10. A metallurgical flux in the form of a compacted body comprising a lime base and sugar.

11. A metallurgical flux in the form of a compacted body comprising a lime base and sugar of the order of 5% by weight of the body.

12. In the basic process of producing steel, the step which consists in the addition to the slag on the molten bath in a furnace, of a metallurgical flux in the form of self-sustaining bodies comprising dominantly a lime base and a minor portion of an ingredient capable when heated of explosively liberating gas to rapidly disintegrate the bodies.

13. In the basic process of producing steel, the step consisting of the addition to the supernatant slag on the molten bath in a furnace, of a metallurgical flux in the form of discrete compacted bodies comprising a lime base and a minor portion of an explosive substance which on being subjected to the heat of the furnace reacts with explosive violence to disrupt the body and scatter the lime base in finely divided form over the surface of the slag.

LEWIS WILLARD CHANTLER.